United States Patent
Sawahashi et al.

(10) Patent No.: US 8,108,746 B2
(45) Date of Patent: Jan. 31, 2012

(54) RADIO COMMUNICATIONS APPARATUS AND RADIO COMMUNICATIONS METHOD

(75) Inventors: Mamoru Sawahashi, Yokohama (JP); Kenichi Higuchi, Yokohama (JP); Hiroyuki Atarashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 729 days.

(21) Appl. No.: 11/909,889

(22) PCT Filed: Mar. 28, 2006

(86) PCT No.: PCT/JP2006/306301
§ 371 (c)(1),
(2), (4) Date: Dec. 1, 2008

(87) PCT Pub. No.: WO2006/106675
PCT Pub. Date: Oct. 12, 2006

(65) Prior Publication Data
US 2009/0217120 A1 Aug. 27, 2009

(30) Foreign Application Priority Data
Apr. 1, 2005 (JP) ................................. 2005-106912

(51) Int. Cl.
*H04L 1/18* (2006.01)
(52) U.S. Cl. ...................................... 714/748
(58) Field of Classification Search .................. 714/746, 714/748–750; 370/208, 236
See application file for complete search history.

(56) References Cited

U.S. PATENT DOCUMENTS

| | | | |
|---|---|---|---|
| 5,517,507 A * | 5/1996 | Needham et al. | 714/748 |
| 6,320,520 B1 | 11/2001 | Luby | |
| 7,149,192 B2 | 12/2006 | Kwak | |
| 2003/0153276 A1 | 8/2003 | Terry et al. | |
| 2004/0228273 A1 | 11/2004 | Kurobe et al. | |
| 2004/0255220 A1 | 12/2004 | Sudo | |
| 2005/0018784 A1 | 1/2005 | Kurobe et al. | |
| 2005/0047346 A1 | 3/2005 | Terry et al. | |
| 2005/0207345 A1 * | 9/2005 | Onggosanusi et al. | 370/236 |

FOREIGN PATENT DOCUMENTS

| | | |
|---|---|---|
| CN | 1547816 A | 11/2004 |
| JP | 2003-304218 | 10/2003 |
| JP | 2004-104293 | 4/2004 |
| JP | 2004-104574 A | 4/2004 |
| JP | 2004-260713 | 9/2004 |

(Continued)

OTHER PUBLICATIONS

AAtarashi et al., An Efficient ARQ scheme for multi-carrier modulation systems based on packet combining, May 1999, IEICE Trans. Comm., vol. E82-B, No. 5, p. 731-739.*

(Continued)

*Primary Examiner* — Shelly A Chase
(74) *Attorney, Agent, or Firm* — Osha • Liang LLP (57) ABSTRACT

A disclosed radio communications apparatus performs at least an automatic repeat request control and performs radio communications using a frame that occupies predetermined plural frequency bands. This apparatus includes a reception portion that receives feedback information about each of a plurality of frequency bands from a communications party, a determination portion that determines which frequency band among the plural frequency bands is to be used to retransmit a retransmission packet indicated by the feedback information, and a transmission portion that transmits the retransmission packet using one or more determined frequency bands.

7 Claims, 11 Drawing Sheets

FOREIGN PATENT DOCUMENTS

| | | | |
|---|---|---|---|
| JP | 2005-006115 A | 1/2005 |
| TW | 565080 A | 12/2003 |
| TW | 200401533 A | 1/2004 |
| WO | 02/09334 A1 | 1/2002 |
| WO | 03019376 A1 | 3/2003 |
| WO | 03-084108 A1 | 10/2003 |

OTHER PUBLICATIONS

T.Ue, S. Aampei, N. Morinaga and K. Hamaguchi, "Symbol Rate and Modulation Level-Controlled Adaptive Modulation/TDMA/TDD system for High-Bit-Rate Wireless Data Transmission", IEEE Transactions on Vehicular Technology, pp. 1134-1147, vol. 47, No. 4, Nov. 1998, Total pp. 4.

S.Lin, D.J. Costello, Jr. and M.J.Miller, "Automatic-Repeat-Request Error Control Schemes", IEEEE Communication Magazine, vol. 22, No. 12, pp. 5-17, Dec. 1984, Total pp. 13.

P. Chow, J. Cioffi and J. Bingham, "A Practical Discrete Multitione Transceiver Loading Algorithm for Data Transmission over Spectrally Shaped Channels", IEEE Transactions on Communications, vol. 43, No. 2/3/4, pp. 773-775, Feb./Mar./Apr. 1995, Total pp. 3.

Japanese Office Action for Japanese Application No. 2005-106912, mailed on Jun. 8, 2010 (3 pages).

Patent Abstracts of Japan for Japanese Publication No. 2004-104574, Publication date Apr. 2, 2004 (1 page).

Patent Abstracts of Japan for Japanese Publication No. 2003-304218, Publication date Oct. 24, 2003 (1 page).

Patent Abstracts of Japan for Japanese Publication No. 2004-260713, Publication date Sep. 16, 2004 (1 page).

International Search Report issued in PCT/JP2006/306301 dated Jun. 27, 2006, 5 pages.

Chinese Office Action for Application No. 200680014465.6, mailed on Jul. 26, 2010 (10 pages).

esp@cenet Patent Abstract for Chinese Publication No. 1547816, publication date Nov. 17, 2004. (1 page).

Taiwanese Office Action for Application No. 95111200, mailed on Sep. 24, 2009 (4 pages).

esp@cenet Patent Abstract for Taiwanese Publication No. 565080, publication date Dec. 1, 2003. (1 page).

Extended European Search Report for Application No. 06730249.7, mailed on Jun. 17, 2011 (7 pages).

\* cited by examiner

|  | RECEPTION QUALITY (EXAMPLE: SIR) | DATA MODULATION |
|---|---|---|
| FREQUENCY BLOCK 0 | 13dB | 16QAM(4 BITS / SYMBOL) |
| FREQUENCY BLOCK 1 | 7dB | QPSK(2 BITS / SYMBOL) |
| FREQUENCY BLOCK 2 | 18dB | 64QAM(6 BITS / SYMBOL) |
| FREQUENCY BLOCK 3 | 25dB | 64QAM(6 BITS / SYMBOL) |

|  | AMC | FEC | ARQ |
|---|---|---|---|
| EXAMPLE 1 FIG. 3 | FOR EVERY FREQUENCY BLOCK | FOR EVERY FRAME | FOR EVERY FRAME |
| EXAMPLE 2 FIG. 5 | FOR EVERY FRAME | FOR EVERY FRAME | FOR EVERY FREQUENCY BLOCK |
| EXAMPLE 3 FIG. 8 | FOR EVERY FRAME | ENTIRE NEW PACKET IN FRAME | FOR EVERY FREQUENCY BLOCK |
| EXAMPLE 4 FIG. 5 | FOR EVERY FREQUENCY BLOCK | FOR EVERY FRAME | FOR EVERY FREQUENCY BLOCK |
| EXAMPLE 5 FIG. 8 | FOR EVERY FREQUENCY BLOCK | ENTIRE NEW PACKET IN FRAME | FOR EVERY FREQUENCY BLOCK |
| EXAMPLE 6 FIG. 10 | FOR EVERY FREQUENCY BLOCK | FOR EVERY FREQUENCY BLOCK | FOR EVERY FREQUENCY BLOCK |

RADIO COMMUNICATIONS APPARATUS AND RADIO COMMUNICATIONS METHOD

TECHNICAL FIELD

The present invention relates to a radio communications field of technology, specifically to a radio communications apparatus and a radio communications method that are capable of controlling an Automatic Repeat Request.

BACKGROUND ART

In the third generation mobile communications method represented by IMT-2000 (International Mobile Telecommunications-2000), a high speed and large capacity downlink is required. For example, an information transmission rate of 2 Mbps has been realized using a frequency bandwidth of 5 MHz. In one of the IMT-2000 systems, single carrier W-CDMA (Wideband-CDMA) has been employed. In addition, a method called High Speed Downlink Packet Access (HSDPA) may be used. The HSDPA enables a high transmission rate and a high quality transmission by employing an Adaptive Modulation and channel Coding (AMC) method, an Automatic Repeat Request (ARQ) method in an MAC layer, or the like. The AMC is described, for example, in Non-patent Publication 1. The ARQ is described, for example, in Non-patent Publication 2. A technology in which a frequency band is divided into plural bands (frequency blocks) and a modulation method is determined for every frequency block is described in Non-patent Publication 3.

Non-patent Publication 1: T. Ue, S. Aampei, N. Morinaga and K. Hamaguchi, "Symbol Rate and Modulation Levelel-Controlled Adaptive Modulation/TDMA/TDD System for High-Bit-Rate Wireless Data Transmission", IEEE Trans. VT, pp. 1134-1147, vol. 47, No. 4, November 1998.

Non-patent Publication 2: S. Lin, Costello, Jr. and M. Miller, "Automatic-Repeat-Request Error Control Schemes", IEEE Communication Magazine, vol. 12, No. 12, pp. 5-17, December 1984.

Non-patent Publication 3: P. Chow, J. Cioffi, J. Bingham, "A Practical Discrete Multitone Transceiver Loading Algorithm for Data Transmission over Spectrally Shaped Channel", IEEE Trans. Commun. vol. 43, No. 2/3/4, February/March/April 1995.

SUMMARY OF INVENTION

Problem to be Solved by the Invention

Figure 1:
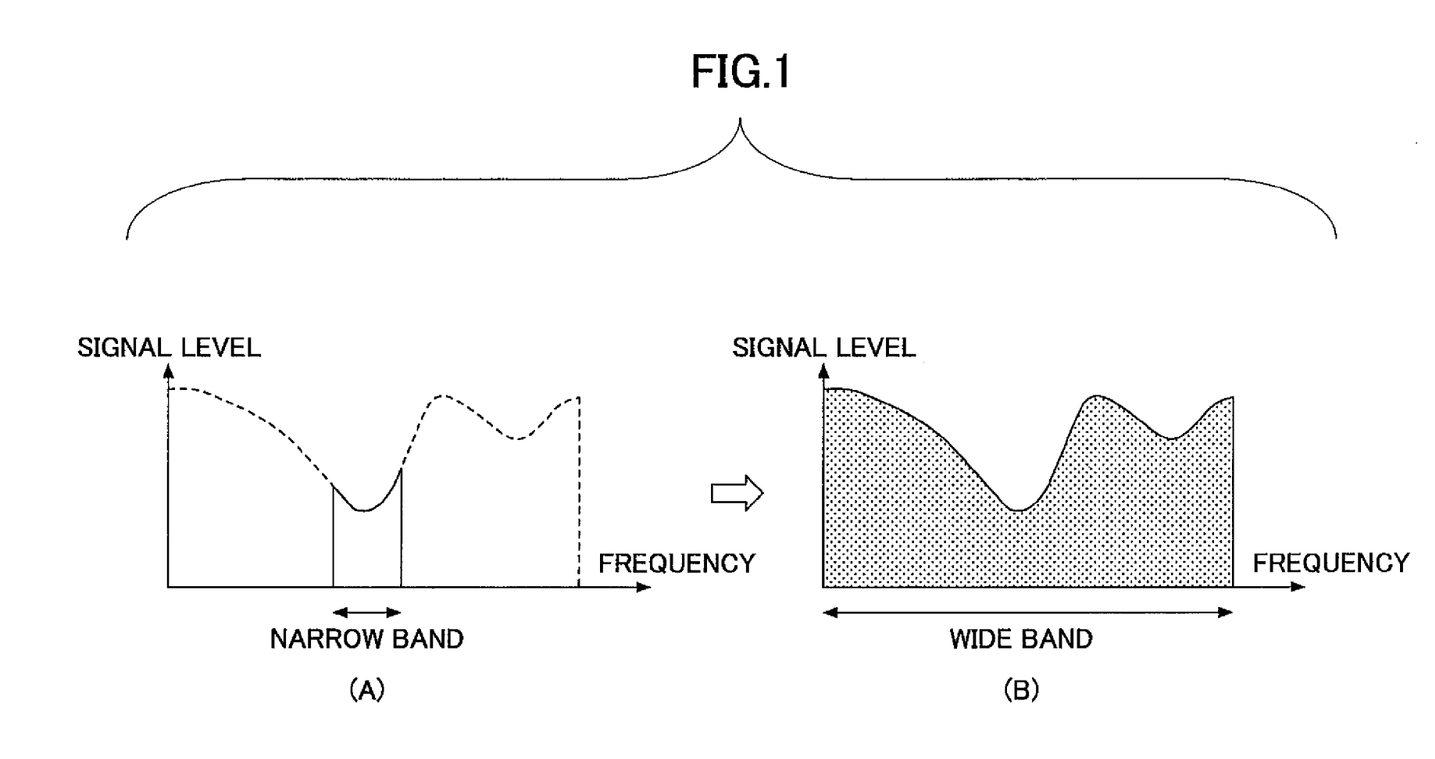
FIG. 1 is a schematic representation of a signal reception level under the influence of frequency selective fading.
Figure 2:
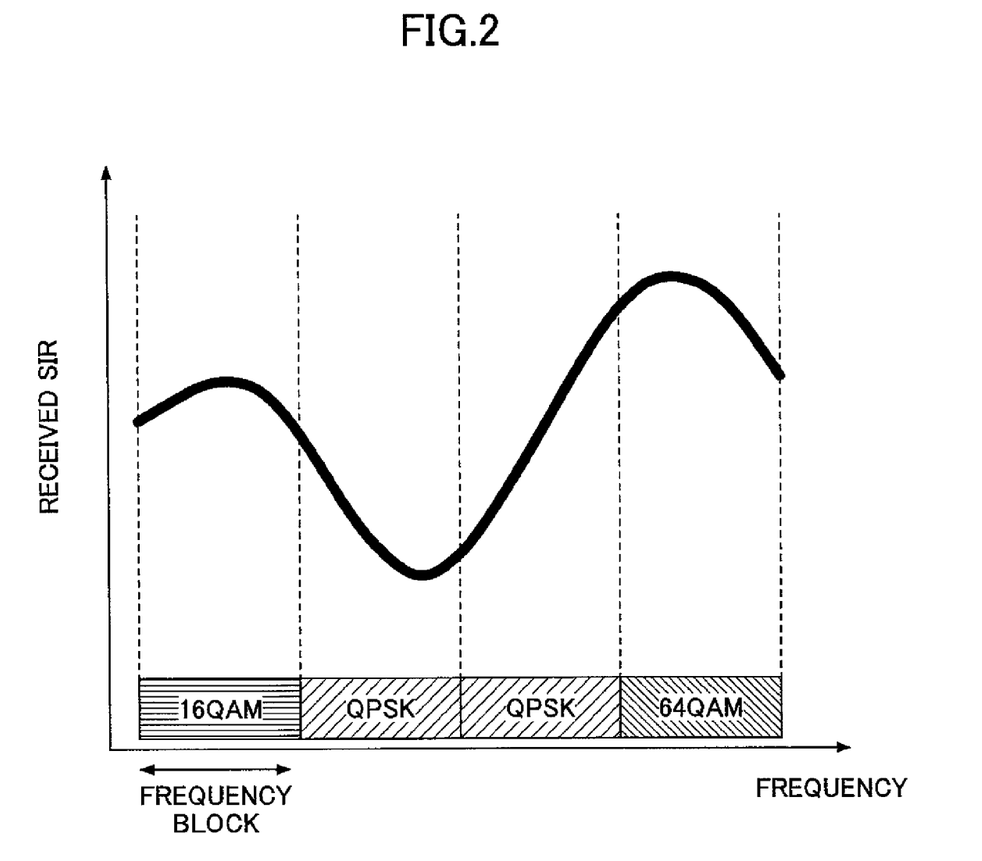
FIG. 2 shows various modulation methods applied to corresponding frequency blocks.

Since further improvements of speed and capacity in radio transmission are desired in this type of technological field, use of a frequency band wider than the frequency band used in a current system is required. However, as the frequency band used in radio transmission becomes wider, frequency selective fading caused by multi-path fading becomes more influential. FIG. 1 shows schematically a reception level of a signal under the influence of frequency selective fading. As shown in FIG. 1(A), when the frequency band used in radio transmission is relatively narrow, the reception level in the band can be assumed as constant. However, as shown in FIG. 1(B), as the frequency band becomes wider, the reception level in accordance with the frequency becomes significant and therefore it is not reasonable to assume the reception level constant. Since "wide" and "narrow" about a bandwidth are relative terms, in this invention, it is assumed here that a bandwidth of 5 MHz used in the current system belongs to a narrow bandwidth category, while a bandwidth of 100 MHz, which is expected to be in use in the next generation system, belongs to a wide bandwidth category. Since a modulation method and a coding rate are determined in accordance with a received quality (e.g., SIR: signal-to-interference power ratio) in the aforementioned Adaptive Modulation and Coding (AMC), a large change in the reception level, which serves as a basis for reception quality evaluation, makes it difficult to determine an appropriate modulation method or the like. In order to address this difficulty, an entire frequency band is divided into plural frequency bands (frequency blocks) and a modulation method is individually determined for each frequency block, according to an invention described in Non-patent Publication 3 as shown in FIG. 2. Specifically, the frequency band is divided into four frequency blocks for which the modulation methods of QPSK, 16QAM, 64QAM, or the like are determined in FIG. 2.

However, packet transmission in which all the data including voice data are transmitted in the form of packets is considered suitable in the future radio communications system. In such packet transmission, the Automatic Repeat Request (ARQ) is suitable as a method to compensate for an error taking place in radio transmission. In addition, error correction coding, in which redundant bits are transmitted and these bits are used in a receiver in order to compensate for an error, is a necessary technology as a method to compensate for an error taking place in radio transmission. Here, when error correction coding is applied to the entire band, a frequency diversity effect is obtained, thereby improving communication quality. On the other hand, the ARQ and the Adaptive Modulation and channel Coding (AMC) provide better communication quality, when applied to frequency blocks into which the frequency band is divided. In addition, dividing the frequency band into the frequency blocks has a disadvantage in that each frequency block requires a corresponding control signal. Therefore, further improvement in radio transmission efficiency and frequency band utilization has been and is desired in the future radio communications system.

The general objective of the present invention is to provide a radio communications apparatus and a radio communications method which may improve frequency utilization efficiency in radio transmission.

A specific objective of the present invention is to provide a radio communications apparatus and a radio communications method in which AMC, ARQ, and channel coding are applied selectively to the frequency blocks or other units, taking account of a trade-off relationship between the improved communication quality described above and an increase of the control signals, thereby avoiding an undue increase of the control signals and improving frequency utilization efficiency.

Means for Solving the Problem

The present invention employs a radio communications apparatus that controls the automatic repeat request at least and performs radio transmission using a frame that occupies predetermined plural frequency bands. This apparatus has a reception portion that receives feedback information about each of the plural frequency bands from a communications party, a determination portion that determines which frequency band among the plural frequency bands is to be used to retransmit a retransmission packet indicated by the feedback information, and a transmission portion that transmits the retransmission packet using one or more determined frequency bands.

Advantage of the Invention

According to the present invention, frequency utilization efficiency in radio transmissions can be improved.

LIST OF REFERENCE SYMBOLS

302: packet generation portion
304: channel coding portion
306: serial to parallel conversion portion
308-1 to 308-N: data modulation portion
310: control portion
312: retransmission control portion
314: MCS determination portion
502: packet generation portion
504: channel coding portion
506: serial to parallel conversion portion
507-1 to 507-N: switch
508-1 to 508-N: data modulation portion
510: control portion
512: retransmission control portion
514: MCS determination portion
802-1 to 802-N: switch
1002-1 to 1002-N: packet generation portion
1004-1 to 1004-N: channel coding portion
1008-1 to 1008-N: data modulation portion
1010: block allocation portion
1012: control portion

BEST MODE FOR CARRYING OUT THE INVENTION

According to an aspect of the present invention, in a radio communications apparatus that performs radio communications using a frame that occupies predetermined plural frequency bands (frequency blocks), it is determined in accordance with feedback information on each of the frequency blocks which frequency block among the plural frequency blocks is used to retransmit a transmission packet indicated by the feedback information, and the transmission packet is transmitted by one or more determined frequency blocks. Therefore, a wide band frequency resource can be efficiently used.

According to another aspect of the present invention, the feedback information includes quality information indicating a reception signal quality in the communications party and packet identification information to identify the retransmission packet.

According to another aspect of the present invention, the frequency band to be used to transmit the retransmission packet is determined in accordance with the quality information indicating the reception signal quality in the communications party.

According to another aspect of the present invention, a modulation method and a coding rate to be used in transmitting a packet are determined for each of the plural frequency bands. Since the AMC control and the ARQ control are performed on every frequency block, the frequency utilization efficiency can be further improved.

According to another aspect of the present inventions the retransmission packet is transmitted by one or more of the plural frequency bands and a new packet is transmitted by one or more of the plural frequency bands. By reducing the frequency blocks which are not used in one frame, the frequency utilization efficiency can be increased.

According to another aspect of the present invention, error correction coding is performed for every frame. By performing such coding throughout the frequency band, the frequency diversity effect can be enhanced and the error correction capability can be improved.

According to another aspect of the present invention, the error correction coding is performed on packets excluding the retransmission packets in a frame.

In the following, various examples of a transmitter according to the present invention will be illustrated. In the illustrated examples, processes related to AMC, error correction coding (e.g. FEC (ForwardErrorCorrection)), and ARQ are performed; and one or more of the AMC-related, the FEC-related, and the ARQ-related processes are performed on each of the plural frequency blocks. An entire frequency band (band occupied by a system) used in radio communications includes plural frequency blocks, which are distinguished when necessary. Generally, the AMC-related process is performed on every frequency block in Example 1, whereas the ARQ-related process is performed on every frequency block in Examples 2 and 3. In Examples 4 and 5, the AMC-related and the ARQ-related processes are performed on every frequency block. In Example 6, the AMC-related, the FEC-related and the ARQ-related processes are performed on every frequency block. From the viewpoint of a unit subjected to the processes, a comparison of the Examples is available in FIG. 11.

Example 1

Figure 3:
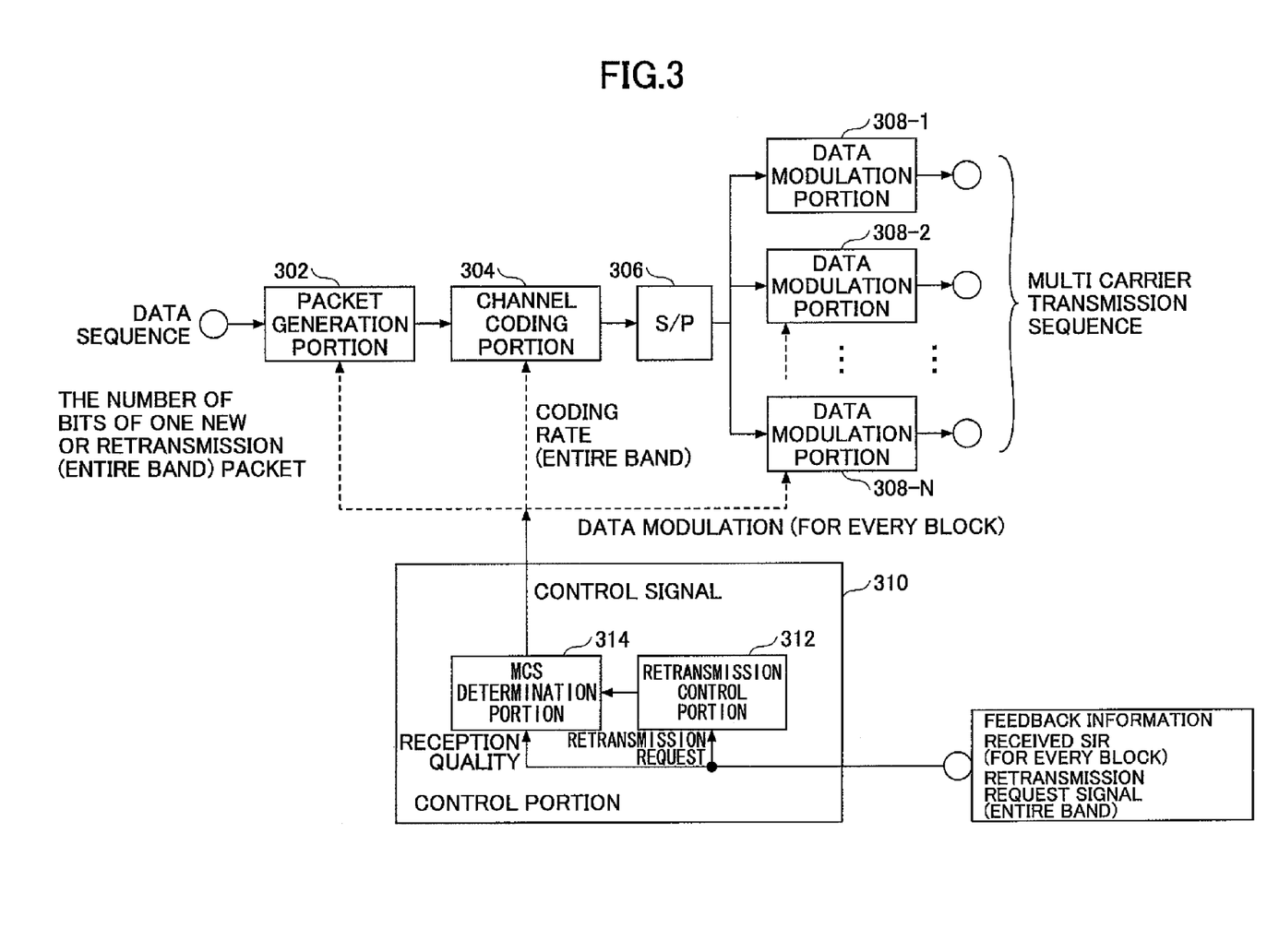
FIG. 3 is a partial block diagram of a transmitter according to one example of the present invention.

FIG. 3 shows a partial block diagram of a transmission apparatus according to one example of the present invention. In FIG. 3, a packet generation portion 302, a channel coding portion 304, a serial to parallel conversion portion 306, data modulation portions 308-1 to 30B-N, the number of which corresponds to the number (N) of frequency blocks, and a control portion 310 are illustrated. The control portion 310 has a retransmission portion 312 and an MCS determination portion 314.

The packet generation portion 302 generates in accordance with a control signal from the control portion 310 a retransmission packet or a new packet from data sequences input to the packet generation portion 302. The retransmission packet has been transmitted beforehand from a transmitter and has a packet number assigned by a receiver. The new packet has not yet been transmitted from the transmitter. Since the number of transmission bits (i.e., the bit number corresponding to one packet) depends on a modulation method, the control signal includes information on the modulation method.

The channel coding portion 304 encodes a packet to be transmitted in accordance with the control signal (information indicating a coding rate included in the control signal) from the control portion 310. The channel coding portion 304 performs an error correction coding (e.g. FEC) on every frame (throughout an entire frequency band).

The serial to parallel conversion portion 306 converts a serial signal sequence input to the portion to parallel signal sequences, the number (N) of which corresponds to the number of the frequency blocks, and outputs the parallel signal sequences.

The N data modulation portions 308-1 to 308-N modulate corresponding frequency blocks of the signal to be transmitted in accordance with the control signal from the control portion 310. The control signal includes information distinguishing modulation methods. Any appropriate modulation method, such as QPSK, 16QAM, 64QAM, or the like may be employed.

The control portion 310 outputs the control signal so as to control operations of each element in the transmitter. The retransmission portion 312 determines whether retransmission to the communications party is required in accordance with feedback information. The feedback information includes a reception signal quality (received SIR) for every frequency block in the communications party, necessity of retransmission, identification information (for example, packet number), error correction information, or the like. It may be determined by information indicating ACK or NACK whether the retransmission is required. The MCS determination potion 314 determines in accordance with the received SIR a modulation method for every frequency block when a retransmission or new packet is transmitted. One coding rate is determined for every frame (throughout the entire frequency band). A frequency band used for one entire frame is divided into plural frequency blocks.

Figure 4:
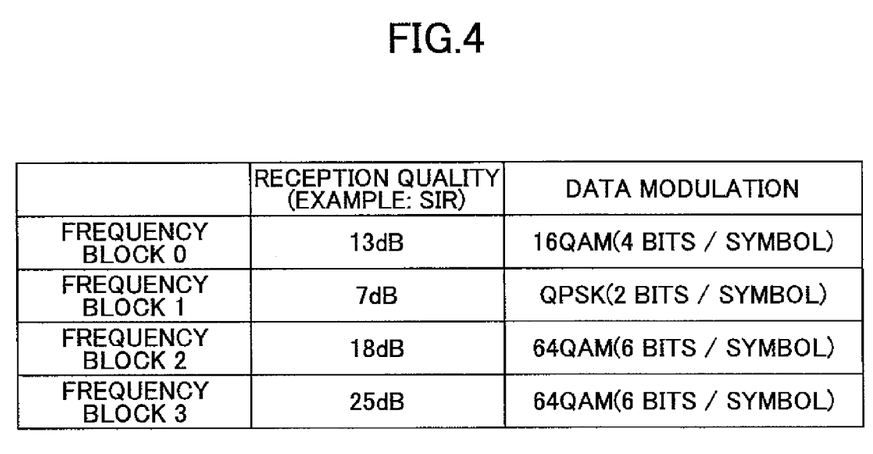
FIG. 4 is a table exemplifying modulation methods determined for corresponding frequency blocks.

An appropriate modulation method may be performed, for example, by referring to a predetermined correspondence relationship, which may be composed of the following.

if $SIR<S1$, then Mod (1) is employed;
if $S1=<SIR<S2$, then Mod (2) is employed;
if $S2=<SIR<S3$, then Mod (3) is employed;
...
if $SS-1=<SIR$, then Mod (S) is employed;

where SIR represents a reception signal quality (received SIR) measured in the communications party; $S1, \ldots, SS$ represent a predetermined signal quality ($S1< \ldots <SS$); and Mod $(1), \ldots$ Mod$(S)$ represent a modulation method such as BPSK, QPSK, 16QAS, and 64QAM. FIG. 4 shows one example of the modulation methods determined in such a manner.

The transmitter of FIG. 3 receives the feedback information from the communications party and determines the necessity of retransmission, the modulation method, or the like. The transmitter determines the necessity of retransmission in accordance with the signal indicating ACK or NACK for every packet. Retransmission is performed when notified of NACK by the communications party, whereas the control portion 319 operates so that a new packet is transmitted when notified of ACK. Here, it is determined whether a frame as whole is retransmitted (namely, retransmission unit is not the frequency block). The transmitter determines an appropriate modulation method for every frequency block in accordance with the received SIR and determines one coding rate for the entire frequency band. In accordance with the determined and distinguished contents, a packet to be transmitted is prepared and the packet is coded, made into parallel signals according to each of the plural frequency blocks. Every frequency block is independently modulated and radio-transmitted from transmitting elements. The radio transmission is performed based on a multi-carrier method such as an orthogonal frequency divisional multiplexing (OFDM). By the way, when the packet is retransmitted, radio parameters (a modulation method, a coding rate, or the like) may be the same as the radio parameters used in the previous transmission, or different parameters re-established in the control portion 310. In addition, the coding rate may be changed for every frequency block.

According to this example, the AMC-related processing is performed on every frequency block. By dividing the frequency band into plural blocks, fluctuations in the received SIR can be reduced, thereby enabling the appropriate radio parameters to be established. Since the AMC is performed on every frequency block, the control signal indicating the modulation method is needed for every frequency block, which may lead to an increased number of the control signals. However, since there are only some ten types of modulation methods (since the modulation methods can be distinguished by 2 to 3 bits), the increased quantity of control information is not very large. In addition, since the error correction coding (e.g. FEC) is performed on the entire frequency band of the frame, a frequency diversity effect is large and error correction capability is kept higher.

Example 2

Figure 5:
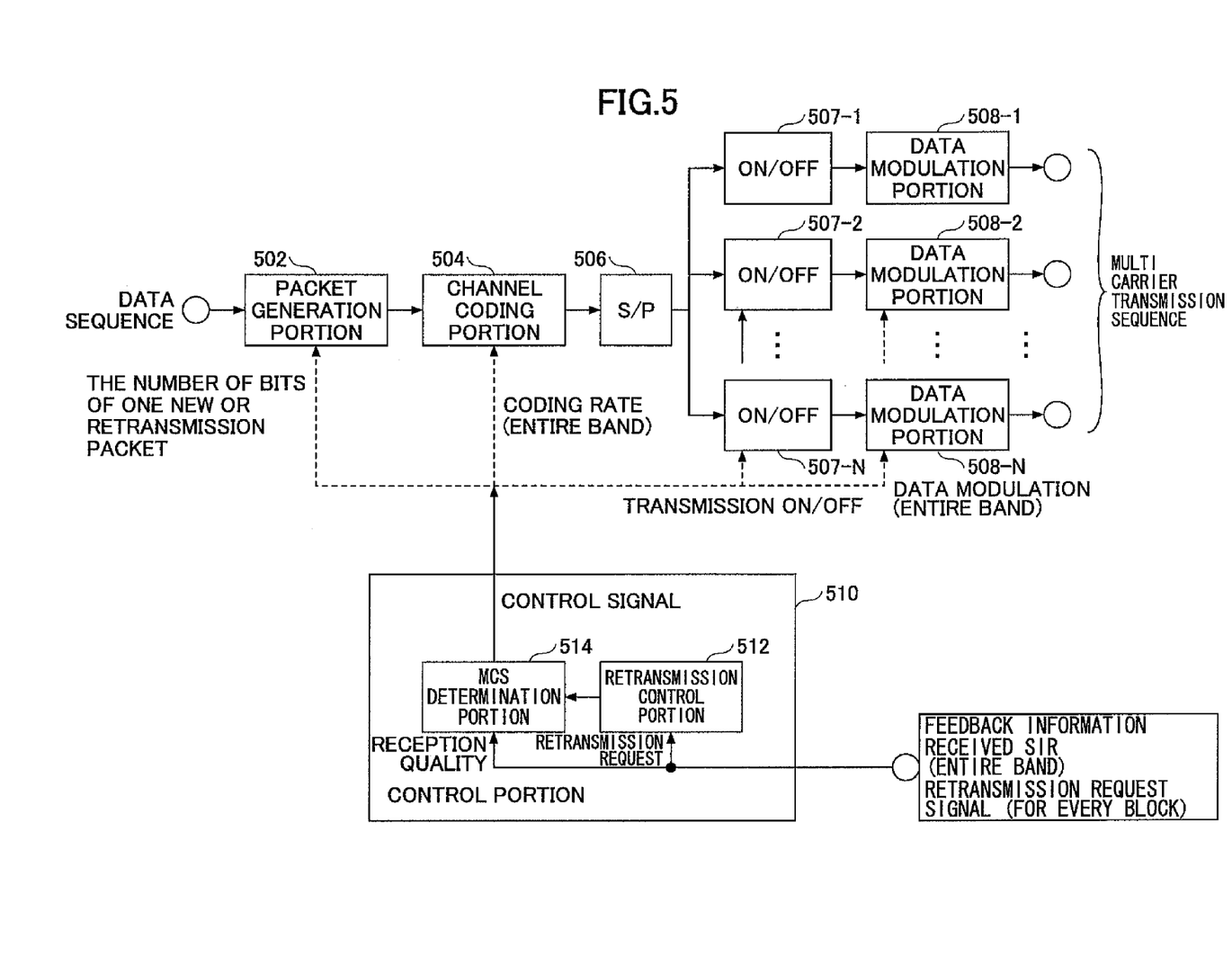
FIG. 5 is a partial block diagram of a transmitter according to another example of the present invention.

FIG. 5 shows a partial block diagram of a transmission apparatus according to another example of the present invention. In FIG. 5, a packet generation portion 502, a channel coding portion 504, a serial to parallel conversion portion 506, switches 507-1 to 507-N, the number of which corresponds to the number of the frequency blocks, data modulation portions 508-1 to 508-N, the number of which corresponds to the number of the frequency blocks, and a control portion 510 are illustrated. The control portion 510 has a retransmission portion 512 and an MCS determination portion 514. Repetitive explanations of elements that have already been described are omitted.

The packet generation portion 502 generates in accordance with a control signal from the control portion 510 a retransmission packet or a new packet from data sequences input to the packet generation portion 502.

The channel coding portion 504 encodes a packet to be transmitted in accordance with information included in the control signal from the control portion 510. The channel coding portion 504 performs the error correction coding (e.g. FEC) throughout an entire frequency band.

The serial to parallel conversion portion 506 converts a serial signal sequence input to the portion to parallel signal sequences, the number (N) of which corresponds to the number of the frequency blocks, and outputs the parallel signal sequences.

The switches 507-1 to 507-N connect the corresponding signal input thereto to the data modulation portion disposed in a subsequent stage in accordance with the control signal from the control portion 501.

The N data modulation portions 508-1 to 508-N modulate the signals to be transmitted in accordance with the control signals from the control portion 510. Any appropriate modulation method such as QPSK, 16QAM, 64QAM may be employed. However, the N data modulation portions 508-1 to 508-N modulate the signals in the same modulation method in this example (AMC is performed as a unit of frame).

The control portion 510 outputs the control signal to control operations of each element in the transmitter. The retransmission control portion 512 determines whether retransmission to a communications party is required in accordance with feedback information. The feedback information includes a reception signal quality (received SIR) for every frequency block in the communications party, necessity of retransmission, identification information (for example, packet number), error correction information, or the like. It may be determined by information indicating ACK or NACK whether retransmission is required. The MCS determination potion 514 determines a modulation method for every frequency block in accordance with the received SIR when a retransmission or new packet is transmitted. An appropriate modulation method and a coding rate may be determined by referring to a predetermined correspondence relationship. One coding rate is determined for every frame (throughout the entire frequency band) in this example. A frequency band used for one entire frame is divided into plural frequency blocks.

The transmitter receives the feedback information from the communications party and determines the necessity of retransmission, the modulation method, or the like. The transmitter determines the necessity of retransmission for every packet in accordance with the signal indicating ACK or NACK. Retransmission is performed when notified of NACK by the communications party, whereas the control portion 319 operates so that a new packet is transmitted when notified of ACK. The transmitter determines one appropriate modulation method and coding rate for the entire frequency band in accordance with the received SIR. In accordance with the determined and distinguished contents, a packet to be transmitted is prepared and the packet is coded, made into parallel signals so as to correspond to each of the plural frequency blocks, modulated by the data modulation portions corresponding to the frequency blocks to be used for retransmission of the packet, and radio-transmitted from transmitting elements. Here, the switches for the frequency blocks to be used for retransmitting the packet to be transmitted are closed while the other switches are open. The radio transmission is performed based on a multi-carrier method such as the orthogonal frequency divisional multiplexing (OFDM). By the way, radio parameters (modulation method, coding rate, or the like) used when the packet is retransmitted may be the same as the radio parameters used in the previous transmission, or different parameters re-established in the control portion 510. In addition, the frequency blocks used when retransmitting the packet may be the same as the frequency block used previously, or different.

Figure 6:
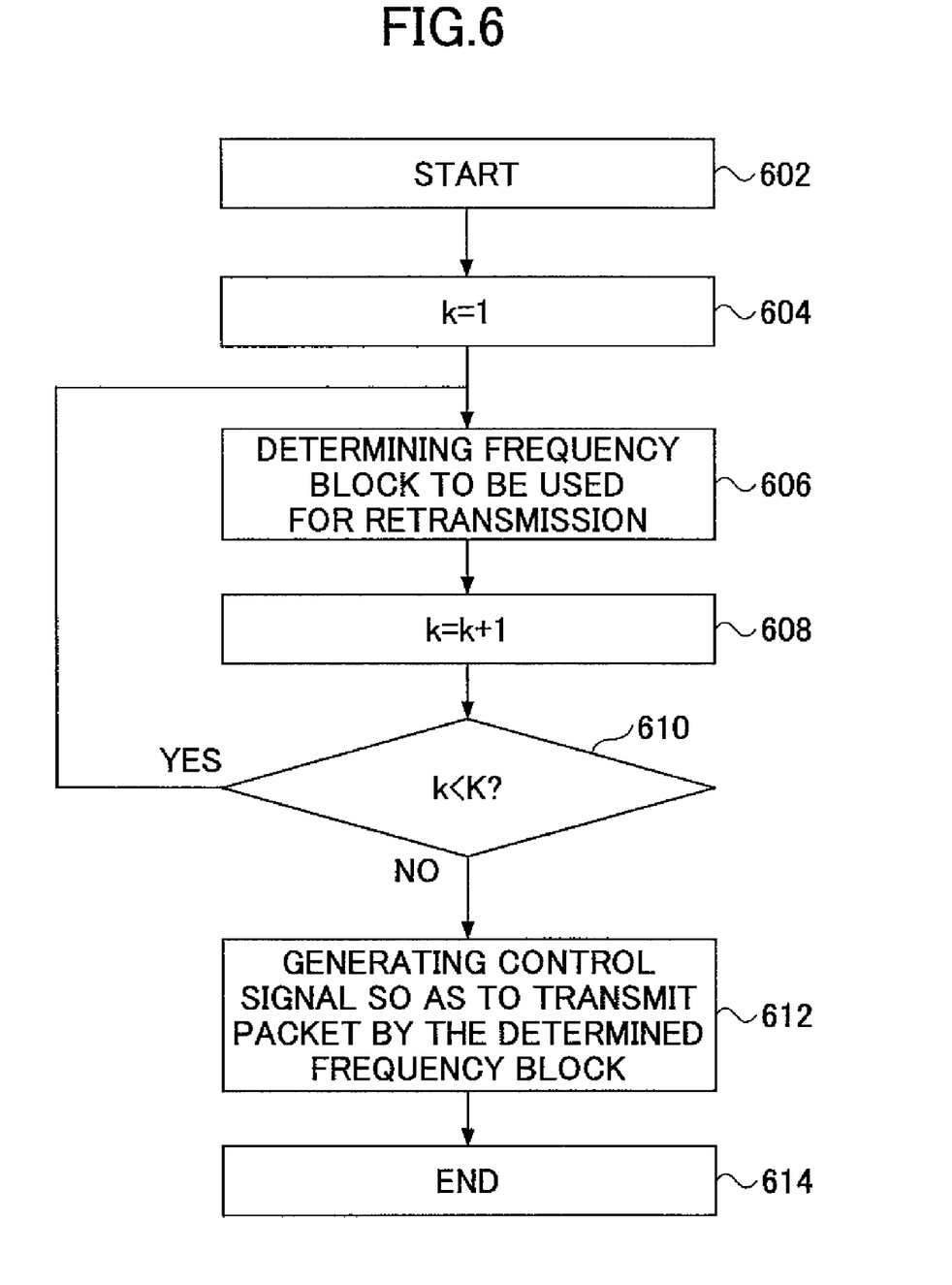
FIG. 6 is a flowchart for generating a control signal that determines a correspondence relationship between a retransmission packet and a frequency block.

FIG. 6 shows part of process that generates a control signal determining a correspondence relationship between a packet to be transmitted and a frequency block, among the entire process performed in the retransmission control portion 512. The flow begins with step 602, in which it is assumed that a frequency block required to retransmit has already been distinguished from plural frequency blocks in accordance with the feedback information. For example, regarding three packets transmitted by frequency blocks B3, B4, and B5 among packets that have been transmitted by five frequency blocks B1, B2, B3, B4, and B5, the NACK signals are reported and these three packets are to be retransmitted. The total number of the retransmission packets is represented by K ($1 \leq K \leq$ the number of the frequency blocks N) Therefore, K=3, N=5 in this example. Retransmission is performed when K is more than or equal to 1, whereas a new packet is transmitted when K=0.

In step 604, a parameter k for distinguishing a packet to be retransmitted is set (k=1). The parameter k is an integer which is more than or equal to 1 and less than or equal to k. In this example, the packet of k=1 has been transmitted by the frequency block B3, whereas the packets of k=2 and k=3 have been transmitted by the frequency blocks B4 and B5, respectively.

In step 606, a frequency block to be used for retransmission of the packet is determined. The most convenient determining method is to choose the same frequency block used previously to transmit the packet. Namely, the packet of k=1 is to be retransmitted by the frequency block B3. Another determining method may be to choose a frequency block that shows the best reception quality. For example, if the second frequency block, B2, has the best reception quality among the five frequency blocks, for example, the packet (k=1) that has been previously transmitted by the frequency block B3 is to be retransmitted by the frequency block B2. This allows the retransmission packet to be securely received by the communications party.

In step 608, the parameter k for distinguishing a packet is incremented and updated.

In step 610, it is determined whether the parameter k reaches the upper limit K. When the parameter k does not reach the upper limit K, the flow returns to the step 606 and the same processes are repeated for another packet that has been transmitted by another frequency block. When the parameter k exceeds the upper limit, the flow proceeds to step 612.

In step 612, a control signal is generated in order that each packet is retransmitted by the determined frequency block. This control signal determines the correspondence relationship between the retransmission packet and the frequency block and controls an open/close state of the switches 507-1 to 507-N. In this example, the switches corresponding to the frequency blocks to be used for packet retransmission are closed and the other switches are open. Then, the flow proceeds to step 614 and ends.

Figure 7:
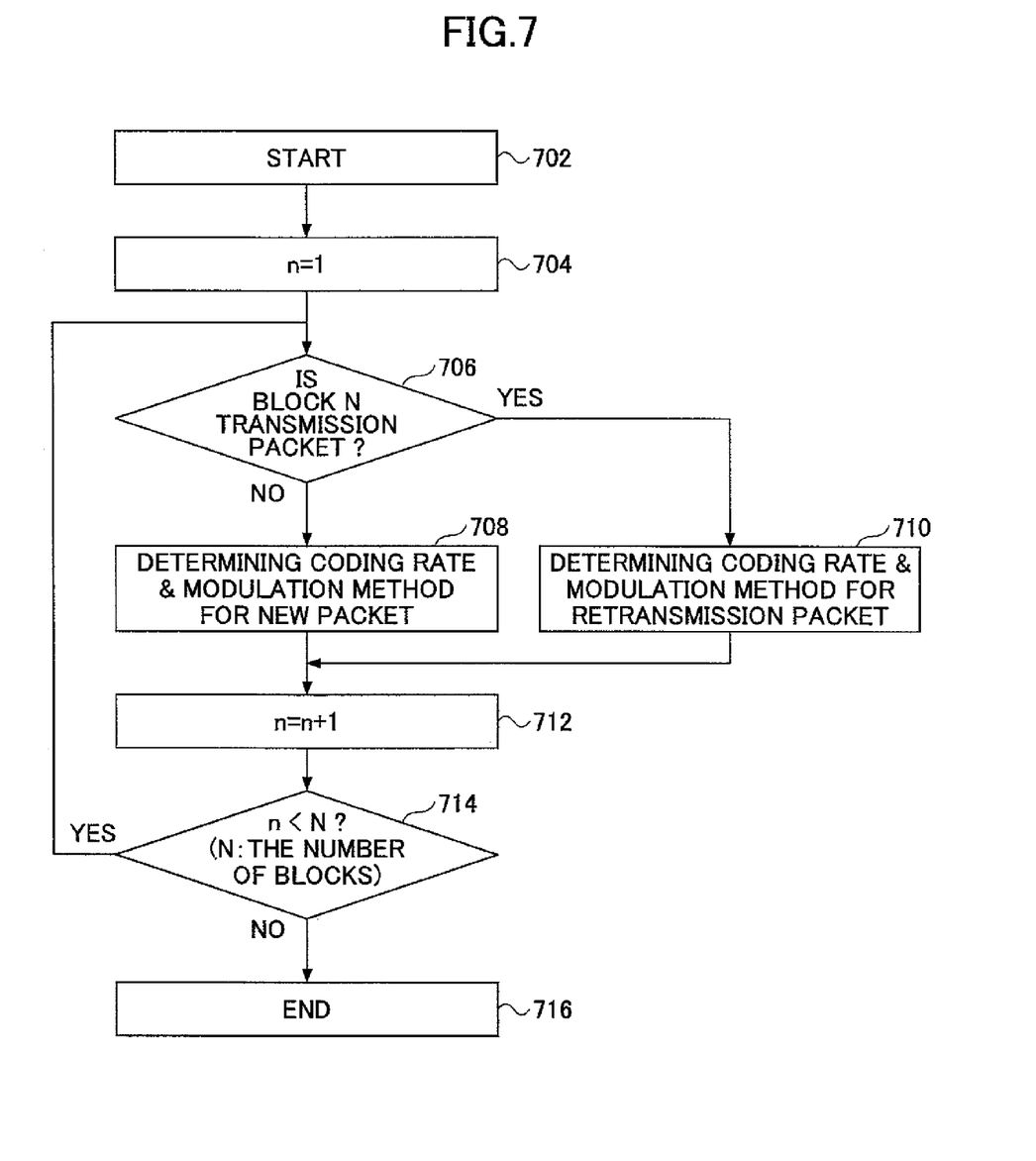
FIG. 7 is a flowchart illustrating a part of process steps performed in an MCS (Modulation and Coding Scheme) determination portion.

FIG. 7 is a flowchart illustrating part of processes performed in the MCS determination portion 514. Similar to FIG. 6, it is assumed that a frequency block required to retransmit has already been distinguished from plural frequency blocks in accordance with the feedback information in step 702. For example, regarding three packets transmitted by frequency blocks B3, B4, and B5 among packets that have been transmitted by five frequency blocks B1, B2, B3, B4, and B5, the NACK signals are reported and these three packets are to be retransmitted.

In step 704, a parameter n for distinguishing plural frequency blocks is set to an initial value (n=1). The parameter n is an integer which is more than or equal to 1 and less than or equal to N. N is the total number of the frequency blocks (N=5 in this example).

In step 706, it is determined whether a packet to be transmitted by a frequency block distinguished by the parameter n is a packet to be retransmitted. When the packet is to be retransmitted the flow proceeds to step 710, whereas if the packet is not a retransmission packet the flow proceeds to step 708.

In step 708, a modulation method and coding rate to be used in transmitting a new packet are determined. This determination is made in accordance with a past reception signal quality or the like.

In step 710, a modulation method and coding rate to be used in transmitting a new packet are determined. Regarding the retransmission packet, a radio parameter such as a modulation method or the like may be determined, similar to the new packet. Or, the radio parameter for retransmission may be the radio parameter that has been used previously, in view of the convenient determination of the radio parameter. In addition, the radio parameter may be determined from a different view point. For example, when a total of 100 bits including information A expressed by 50 bits and redundant information B expressed by 50 bits has been transmitted, only redundant information, which may be the same as the redundant information B or another, is retransmitted. In this case, although the original coding rate in the receiver is ½, when the retransmitted information is considered, the coding rate becomes ⅓, which enhances the error correction capability of the received information.

In step 712, the parameter n for distinguishing frequency blocks is incremented and updated.

In step 714, it is determined whether the parameter n reaches an upper limit value N. When the parameter n does not reach the upper limit value, the flow returns to the step 706 and the same processes are repeated for another frequency block. When the parameter n exceeds the upper limit value N, the flow proceeds to step 716 and ends.

According to this example, the automatic repeat request (ARQ) is performed as a unit of frequency block and a packet is retransmitted as a unit of frequency block. This makes it possible to choose a packet related to a frequency area whose characteristics become poor as a retransmission packet, thereby improving retransmission efficiency.

Example 3

Figure 8:
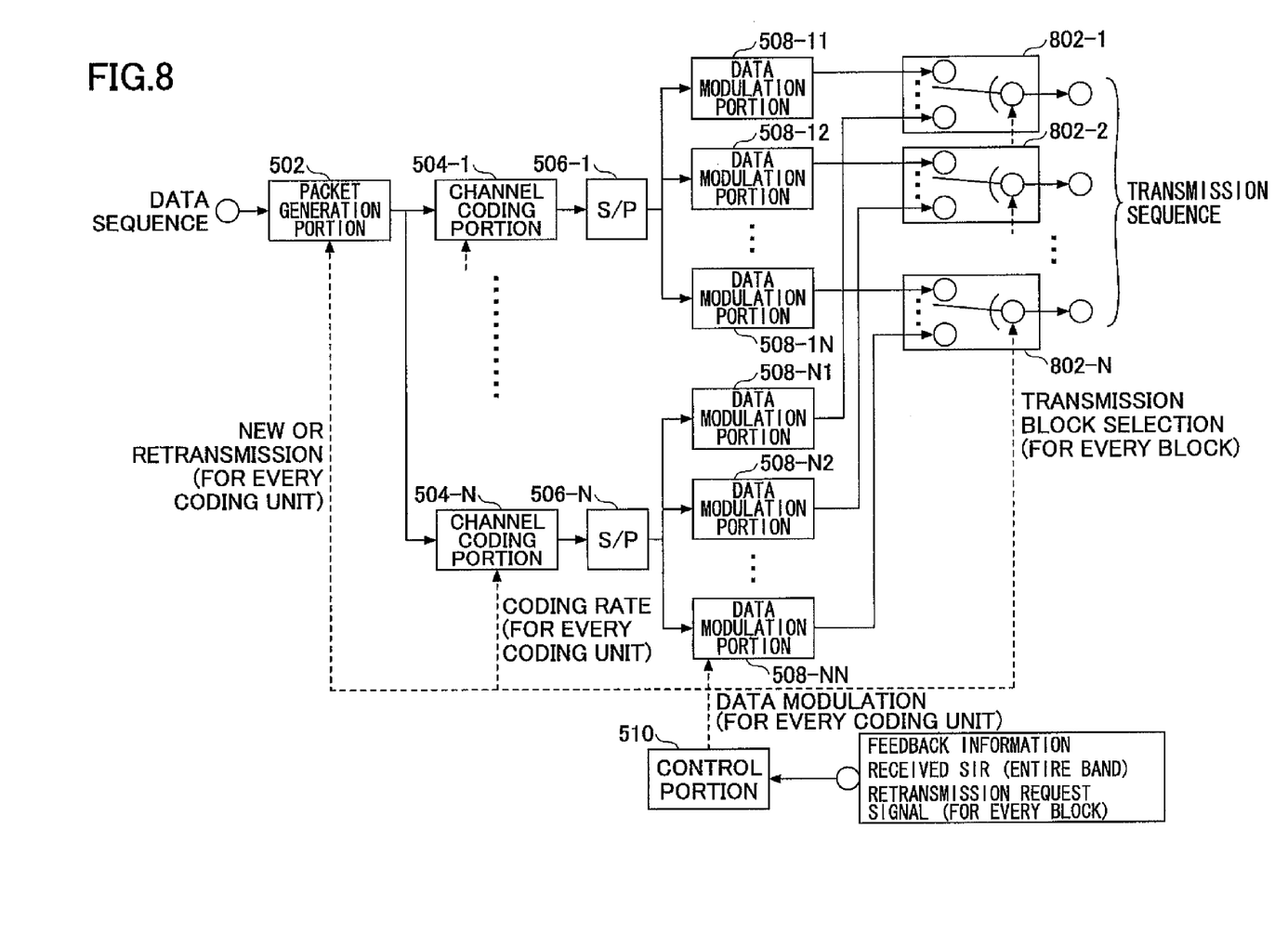
FIG. 8 is a partial block diagram of a transmitter according to another example of the present invention.

FIG. 8 is a partial block diagram of a transmitter according to another example of the present invention. FIG. 8 illustrates N groups of processing elements including the channel coding portion, the serial to parallel transformation portion, and the N data modulation portions, which are the same as shown in FIG. 5. In addition, N switches 802-1 to 802-N controlled by the control portion 510 are illustrated in FIG. 8. Each element is the same as the element that has already been described in reference to FIG. 5, and therefore repetitive explanations are omitted.

As stated above, the control signal given to the switches 507-1 to 507-N of FIG. 5 of Example 2 control the open/close state of the switches 507-1 to 507-N in accordance with the correspondence relationship between the retransmission packet and the frequency block. In Example 2, the switches for the frequency block to be used for the retransmission packets are closed and the other switches are open. In Example 3 in the following, the frequency blocks that are not used for packet retransmission are used for transmitting new packets.

Figure 9:
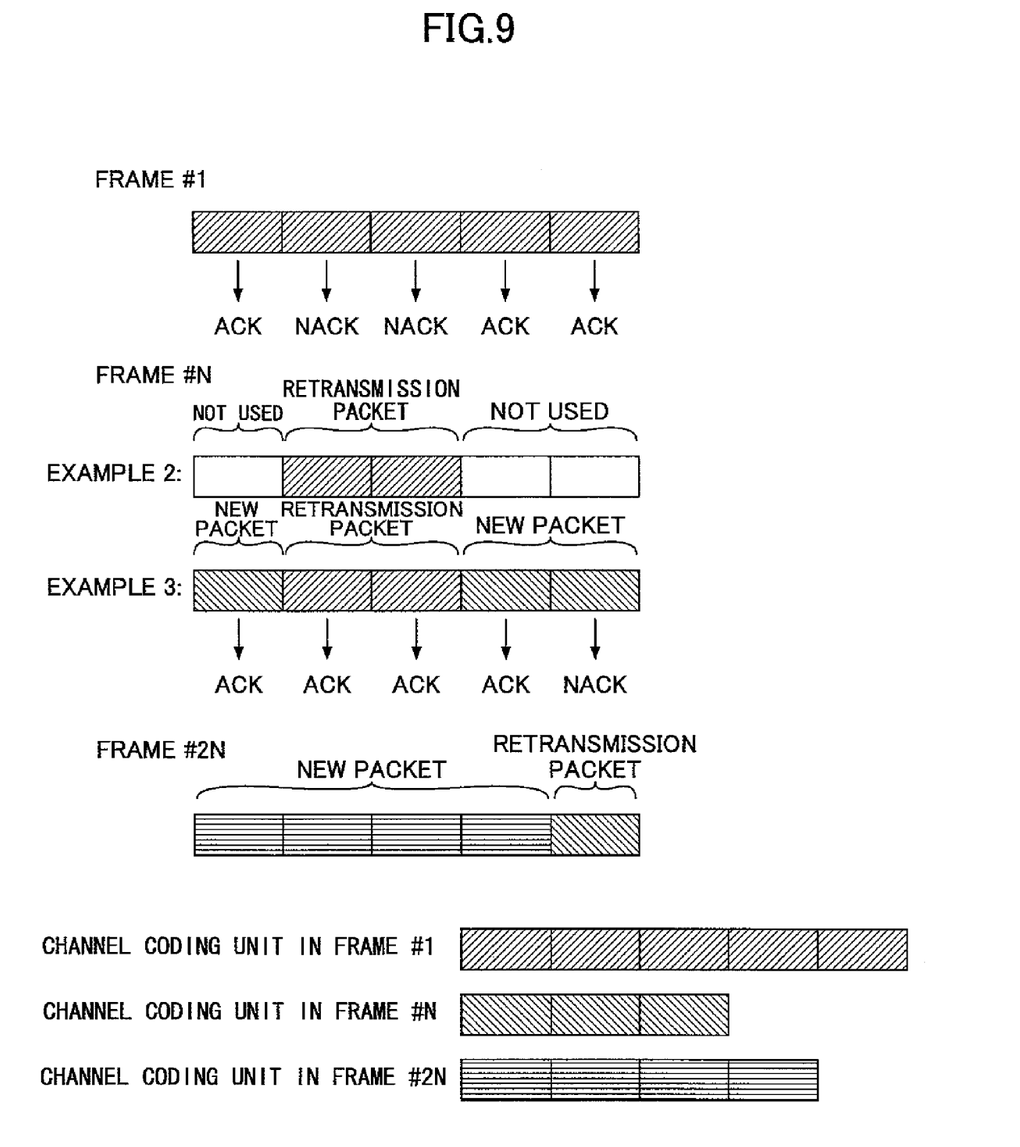
FIG. 9 is an explanatory view about operations of Example 3.

FIG. 9 is an explanatory view for explaining operations in this example. For simplicity of explanations, it is assumed that packets are transmitted by five frequency blocks B1, B2, B3, B4, and B5. The channel coding is performed on every frame throughout the entire frequency band. Among the five packets transmitted by the corresponding frequency blocks in a first frame, the NACK signals are reported for the packets transmitted by the frequency blocks B2 and B3, and these two packets are to be retransmitted. The retransmission is to be performed in the N-th frame. In the technique in Example 2, the two frequency blocks among the five frequency blocks in the N-th frame are used for retransmission, and the three frequency blocks are not used. In this example, these three frequency blocks are used for transmitting new packets. For simplicity of explanations, the retransmission packets are assumed to be transmitted by the same frequency blocks that have been used previously in the illustrated example. Therefore, the retransmission packets are transmitted by the frequency blocks B2, B3 and new packets are transmitted by the other frequency blocks B1, B4, B5. The channel coding is performed entirely on the new packets, namely, on the three frequency blocks, in the illustrated example. Assuming that regarding the N-th frame the NACK signal is reported for the packet transmitted by the frequency block B5, the packet is retransmitted by the frequency block B5 in a 2N-th frame and four new packets are transmitted by the other frequency blocks. The channel coding is performed entirely on the new packets, namely, on the four frequency blocks in the illustrated example. The switches 802-1 to 802-N are appropriately switched in order to transmit the packets in such a frame configuration shown by the frames #N, 2N.

Even in this example, the retransmission control portion 512 in the control portion 510 can determine the correspondence relationship between the retransmission packet and the frequency block in accordance with the flow described in reference to FIG. 6. In addition, in step 606 of FIG. 6, the packet is retransmitted by the frequency block having the worst reception quality in this example, which can preferentially allocate an excellent resource to the new packets rather than the retransmission packet. Otherwise, the transmission packet may be transmitted by a frequency block having quality that is better than or equal to a difference between a necessary reception quality value that enables error-free reception and the reception quality (received SIR) reported from the communications party. For example, when the reception level for error-free reception is 10 dB and the received SIR for the packet to which the NACK is reported is 6 dB, the frequency band that is reported with a quality value of more than or equal to 4 dB is used for retransmission. In such a manner, allocation of the frequency block is made in accordance with the least necessary reception level, thereby improving retransmission efficiency.

Example 4

Although the ARQ-related process is performed on every frequency block in Example 2, the AMC-related process, in addition to the ARQ-related process, is performed on every frequency block in this example. An apparatus configuration of a transmitter is generally the same as the configuration shown in FIG. 5. In this example, the feedback information input to the control portion 510 may include a received SIR (reception signal quality in the communications party) for every frequency block, necessity of retransmission of a packet for every frequency block, a packet number for every frequency block when retransmission is needed, or the like. The channel coding is performed throughout the entire frame (all frequency blocks). In this example, since a modulation method is determined for every frequency block, the modulation methods employed in the data modulation portions 508-1 to 508-N are not necessarily the same but determined independently. According to this example, the modulation method and retransmission unit are determined for every frequency block, thereby enabling retransmission of the retransmission packet by more appropriate radio parameters.

Example 5

Although the ARQ-related process is performed one every frequency block in Example 3, the AMC-related process, in addition to the ARQ-related process, is performed on every frequency block. An apparatus configuration of a transmitter is generally the same as the configuration shown in FIG. 8. However, as is the case with Example 4, the modulation methods employed in the data modulation portions 508-11 to 508-NN are not necessarily the same but independently determined. According to this example, in addition to determination of the modulation method and the retransmission unit for every frequency block, a frame having both the retransmission packets and the new packets is generated and a coding unit is dynamically changed, thereby realizing more efficient packet transmission.

Example 6

Figure 10:
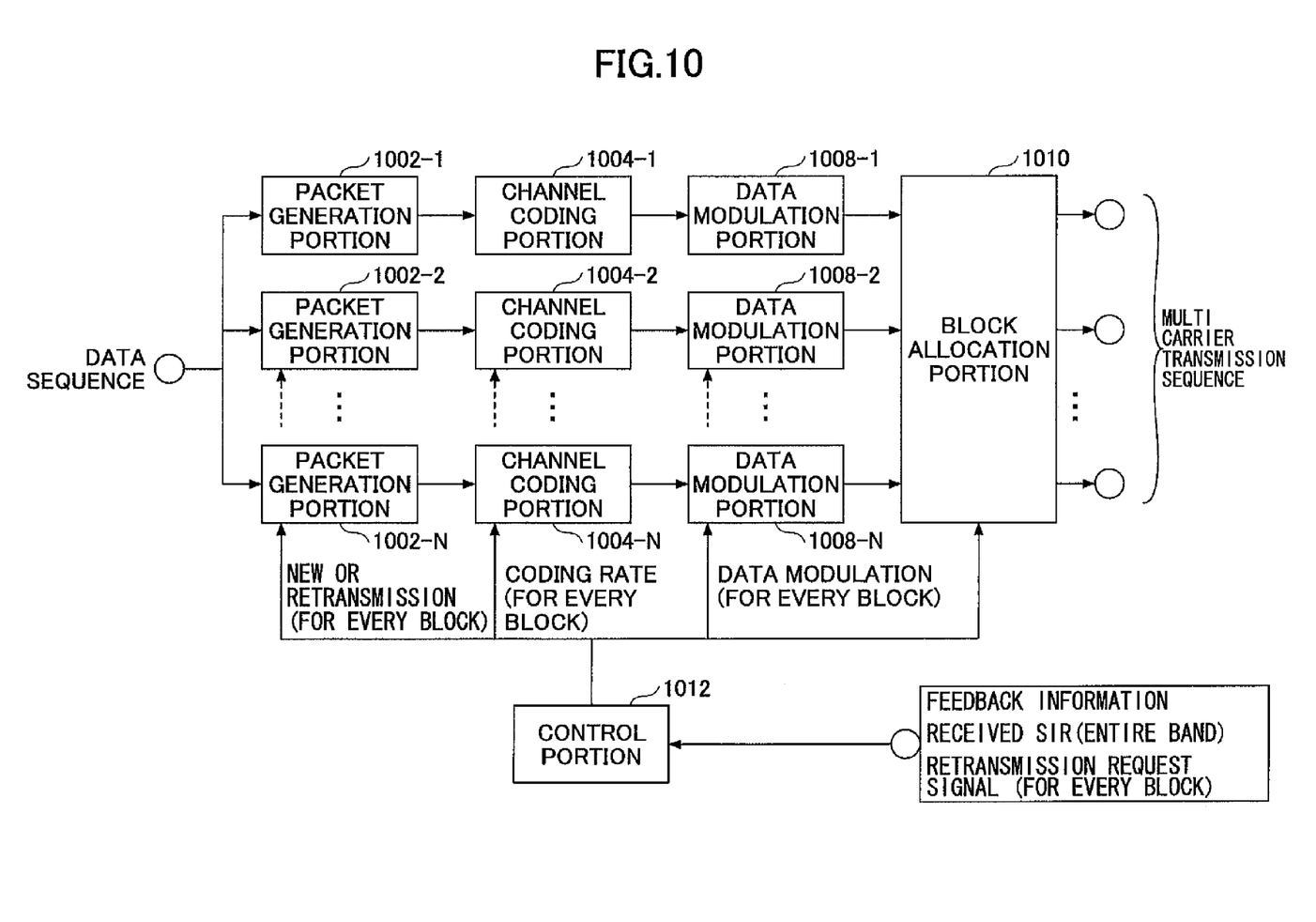
FIG. 10 is a partial block diagram of a transmitter according to another example of the present invention.

FIG. 10 is a partial block diagram of a transmitter according to another example of the present invention. In FIG. 10, packet generation portions 1002-1 to 1002-N, channel coding portions 1004-1 to 1004-N, data modulation portions 1008-1 to 1008-N, the numbers of which corresponds to number of the frequency blocks, a block allocation portion 1010, and a control portion 1012 are illustrated. Repetitive explanations of elements that are the same as the elements that have already been described are omitted. As shown, processes regarding all the AMC, FEC and ARQ are performed on every frequency block. Therefore, the received SIR and the retransmission request signal included in the feedback information are obtained for every frequency block. Packets to be transmitted are generated, coded, and modulated for a unit of a frequency block. Each of the modulated packets is transmitted by any one of plural frequency bands. The correspondence relationship between the modulated packet and the frequency band is adjusted under control of the control portion 1012 in the block allocation portion 1010. According to this example, since processes regarding all the AMC, FEC, and ARQ are performed, the transmission efficiency is expected to be most enhanced.

Figure 11:
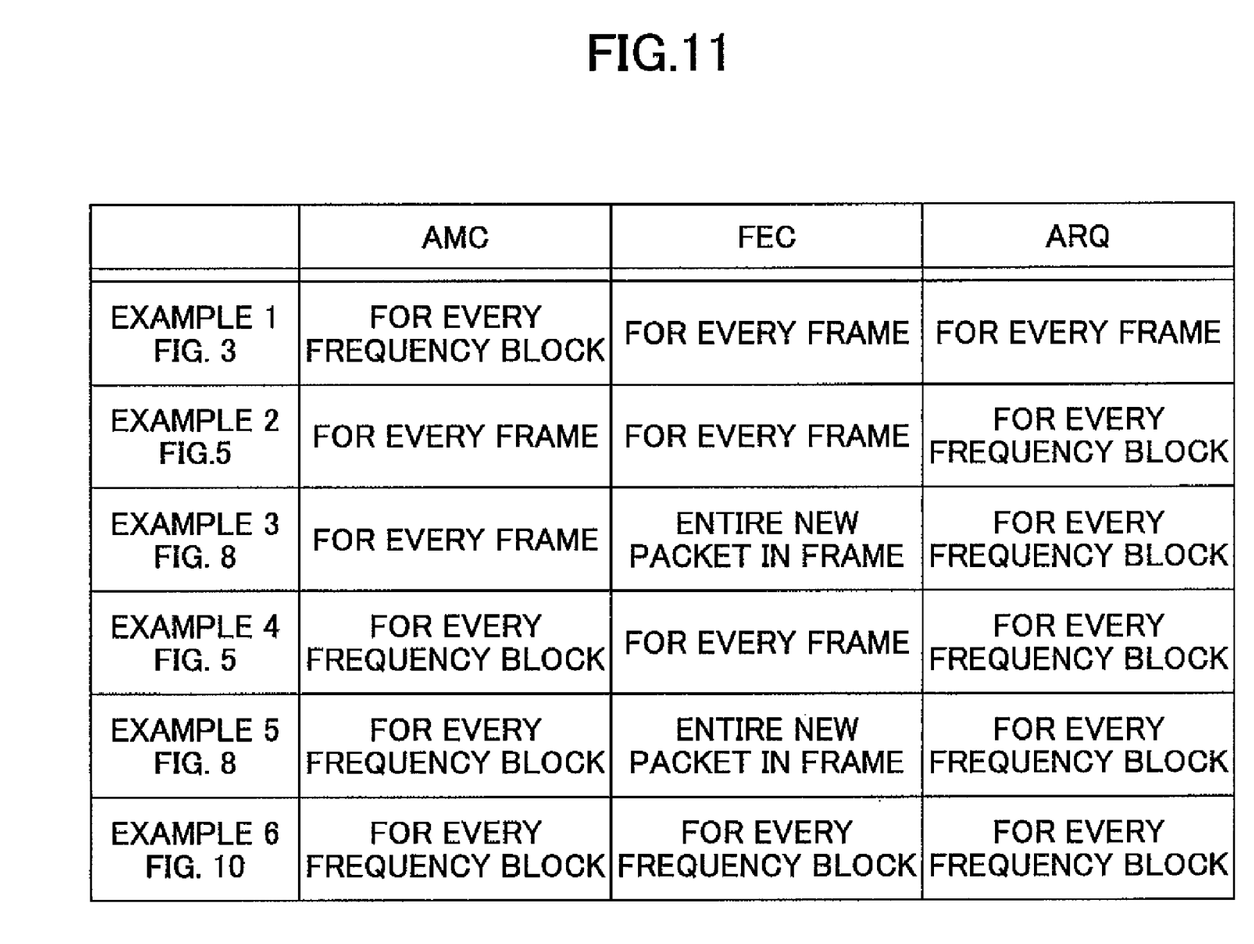
FIG. 11 is a table for comparing examples in view of a processing unit.

FIG. 11 shows a diagram for comparing each method described as Example 1 to 6. As is shown, in Example 1, the AMC is performed on every frequency block, whereas the FEC and the ARQ are performed on every frame. The entire frequency band to be used in one frame is divided into plural frequency blocks. In Example 2, the AMC and the FEC are performed on every frame, whereas the ARQ is performed on every frequency block. In Example 3, the AMC is performed on every frame; the FEC is performed on an entire new packet in a frame; and the ARQ is performed on every frequency block. In Example 4, the AMC and the ARQ are performed on every frequency block, whereas the FEC is performed on every frame. In Example 5, the AMC is performed on every frequency block; the FEC is performed on an entire new packet in a frame; and the ARQ is performed on every frequency block.

While the preferable examples of the present invention have been described above, the present invention is not limited to those examples, but many alterations and modifications will be possible within the scope of the present invention. Although the present invention has been described referring to several individual examples for simplicity of explanations, these individual examples are not essential to the present invention, but one or more examples may be implemented in accordance with demands.

This international patent application is based on Japanese Priority Application No. 2005-106912, filed on Apr. 1, 2007, with the Japanese Patent Office, the entire contents of which are hereby incorporated by reference.

The invention claimed is:

1. A radio communications apparatus that performs at least an automatic repeat request control and performs radio communications using a frame that occupies predetermined plural frequency bands, the apparatus comprising:
   a reception portion that receives feedback information about each of the plural frequency bands from a communications party;
   a determination portion that determines which frequency band among the plural frequency bands is used to retransmit a retransmission packet indicated by the feedback information; and
   a transmission portion that transmits the retransmission packet using one or more determined frequency bands,
   wherein error correction coding is performed on packets excluding the retransmission packet in a frame.

2. The radio transmission apparatus of claim 1, wherein the feedback information includes quality information indicating a reception signal quality in the communications party and packet identification information to identify the retransmission packet.

3. The radio communications apparatus of claim 1, wherein the frequency band to be used to transmit the retransmission packet is determined in accordance with quality information indicating the reception signal quality in the communications party.

4. The radio communications apparatus of claim 1, further comprising a determination portion that determines for each of the plural frequency bands a modulation method and a coding rate to be used in transmitting a packet.

5. The radio communications apparatus of claim 1, wherein the retransmission packet is transmitted by one or more of the plural frequency bands and a new packet is transmitted by one or more of the plural frequency bands.

6. The radio communications apparatus of claim 1, wherein the error correction coding is performed for every frame.

7. A radio communications method in which Adaptive Modulation and channel Coding and Automatic Repeat Request are employed and radio communications are performed using a frame that occupies predetermined plural frequency bands, the method comprising:
   receiving feedback information about each of the plural frequency bands from a communications party;
   determining which frequency band among the plural frequency bands is to be used to retransmit a retransmission packet indicated by the feedback information;
   determining a coding rate and a modulation method for the retransmission packet in accordance with the feedback information; and
   transmitting the retransmission packet using the determined coding rate and modulation method and the determined one or more frequency bands,
   wherein error correction coding is performed on packets excluding the retransmission packet in a frame.

* * * * *